UNITED STATES PATENT OFFICE.

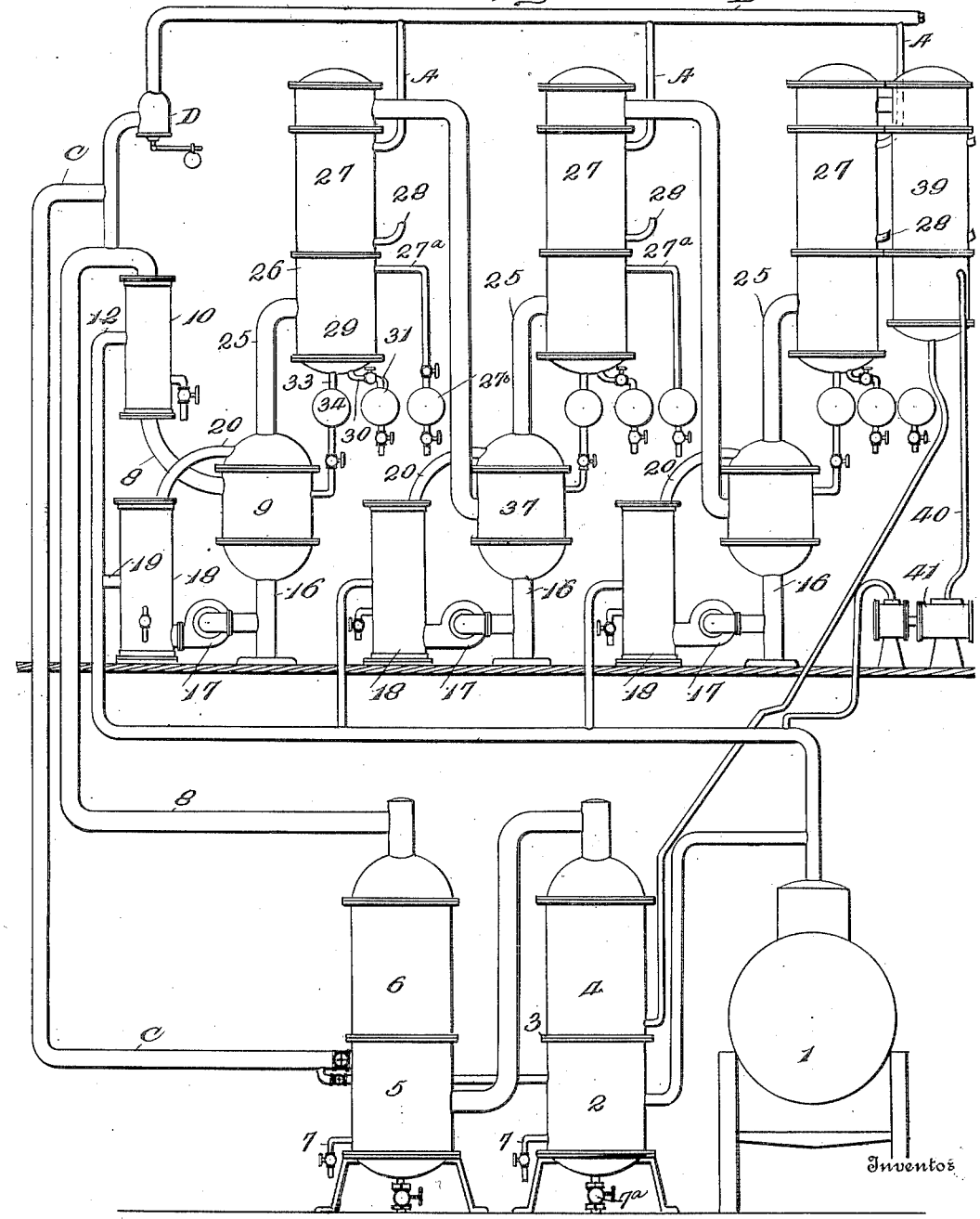

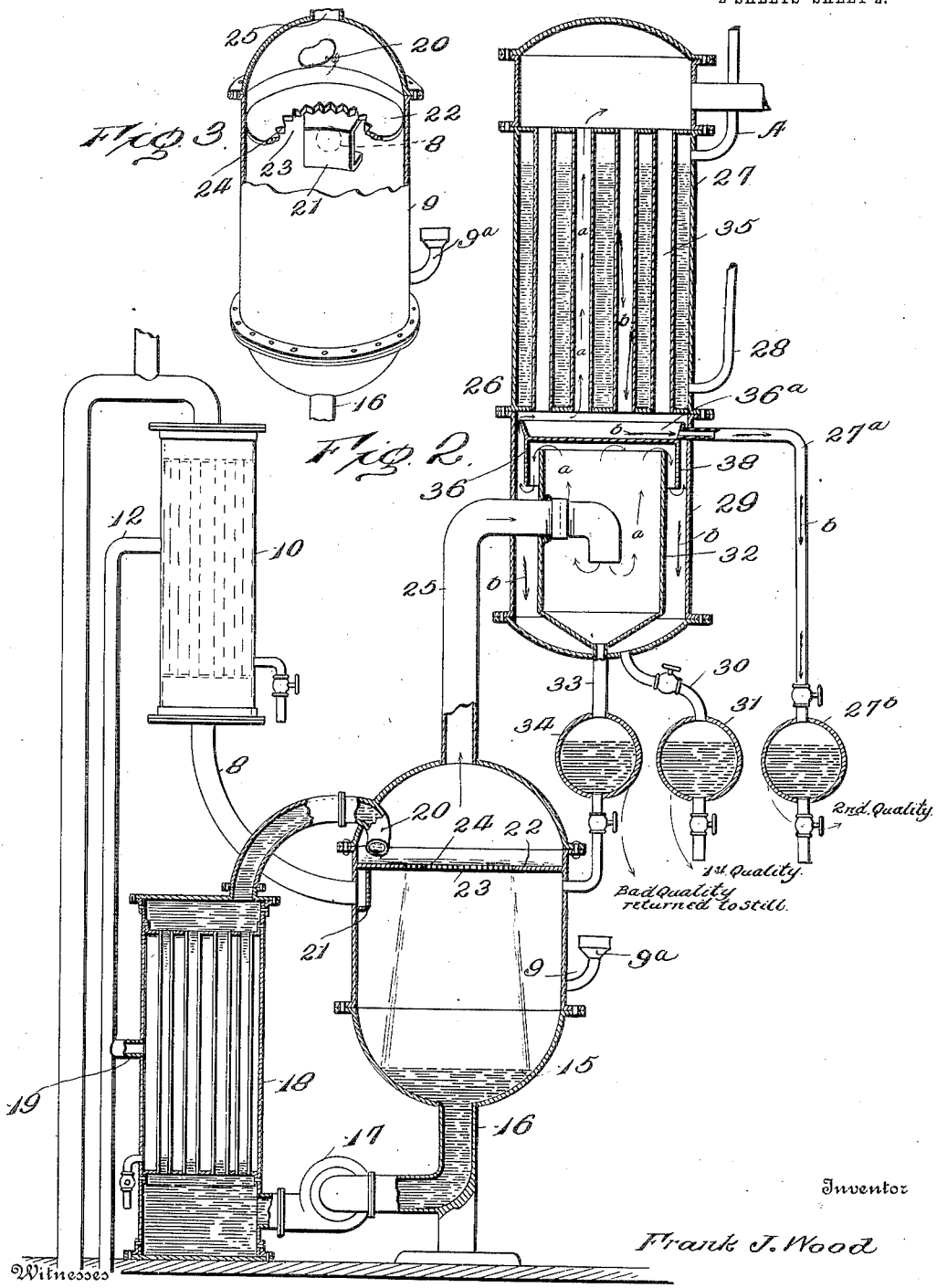

FRANK J. WOOD, OF NEW YORK, N. Y., ASSIGNOR TO MARX & RAWOLLE, OF NEW YORK, N. Y., A CORPORATION OF NEW YORK.

APPARATUS FOR DISTILLING GLYCERIN.

1,098,543. Specification of Letters Patent. Patented June 2, 1914.

Application filed August 13, 1907, Serial No. 388,396. Renewed October 22, 1913. Serial No. 796,730.

*To all whom it may concern:*

Be it known that I, FRANK J. WOOD, of New York, in the county of Kings and State of New York, have invented certain new and useful Improvements in Apparatus for Distilling Glycerin; and I do hereby declare the following to be a full, clear, and exact description of the invention, such as will enable others skilled in the art to which it appertains to make and use the same.

In the treatment of fats and oils of animal or vegetable origin for the purpose of breaking them up into their constituents, fatty acids and glycerin, it is customary, especially when the acids are to be used for the manufacture of soap, to employ an alkali, such as caustic soda or potash dissolved in water. In the presence of an alkali and assisted by heat the water breaks up the fat into glycerin and fatty acids, the latter combining with the alkali to form soap which remains in solution and is generally precipitated and separated therefrom by the addition of salt. The salt used for this purpose remains dissolved in the aqueous solution of the glycerin. The evaporation of this solution, known as spent lye, yields the soap lye crude glycerin of commerce which usually contains 8 to 10% salt and greatly exceeds in amount the output of candle crude glycerin which is free from salt.

The primary object of my present invention is to provide improved means for distilling glycerin of the character mentioned, that is, glycerin containing salt.

The invention is, however, also available for use in distilling any liquid or material which is decomposable in distillation.

In Letters Patent No. 881,525, of March 10, 1908, issued on my application, I have set forth a process of distilling glycerin the essential feature of which is the multiple effect of a continuous current or flow of steam, that is, utilizing a single column of steam for successively combining with, and effecting the distillation of, the glycerin contained in a plurality of stills. This process has been found in practice to effect a great saving in steam and consequently in fuel. Each of the stills shown and described in the Letters Patent referred to as furnishing appropriate means for carrying out the process comprises in its organization a still, proper, and a subjacent glycerin tank or reservoir from which the glycerin is pumped to the top of tubes vertically disposed in the still, the glycerin falling by gravity and heated in its fall, and mingling with the steam a portion combining therewith in the form of vapor, after which the glycerin is condensed and the steam is conducted to a succeeding still. Stills of this construction operate successfully when the glycerin is relatively free of salt, but when the glycerin contains a quantity of salt it has been found in practice that the columns of superheated steam coming into sudden contact with the gravitating columns of glycerin within the confined area of the heated tubes quickly vaporize the glycerin and deposit the salt on the walls of the tubes. This deposit forms a hard incrustation which increases with the continued use of the still and tends to clog the passage through the tubes.

By my present invention these difficulties are effectively overcome, the idea, broadly stated, comprehending the heating of the glycerin prior to its union with the steam, and providing improved means for enabling the steam to be successively utilized without superheating prior to each distillation, the manner of the subsequent union of the glycerin and steam and the lines of travel of the combined vapors obviating the possibility of salt depositing on a heating surface and affording means for separating it from the glycerin and withdrawing it from the distillation system.

In the accompanying drawing I have shown in Figure 1 a conventional arrangement of the system. Fig. 2 is a vertical sectional view of one of the stills, the steam superheater, glycerin heater and the glycerin condenser. Fig. 3 is a perspective view of one of the stills broken away.

Referring to the drawings, 1 designates a steam boiler having its steam space in communication with the heating space 2 of an evaporator 3, the vapor space 4 of which in turn is open to the heating space 5 of a second evaporator 6, the heating spaces 2 and 5 having suitable outlets 7 for water of condensation and outlets 7ª for glycerin. From evaporator 6 a pipe 8 leads to the first of the stills 9, a steam superheater 10 being shown arranged at a point in pipe 8 near the still and communicating by a pipe 12 with the steam space of the boiler. This superheater, however, may be dispensed with if the steam is dry.

The still constitutes at its lower portion a reservoir or receptacle for glycerin supplied at 9ª, the liquid being indicated at 15, although much more than the amount indicated may be supplied. An outlet pipe 16 is shown leading from beneath the body of liquid into the still near its top above the entrance point of the steam pipe 8. Glycerin is forced through pipe 16 by the action of a centrifugal pump indicated at 17.

18 designates a glycerin heater to which high pressure steam is supplied from the boiler through pipe 19 shown as a branch of pipe 12. By reference to Fig. 3 of the drawings it will be seen that the glycerin pipe 16 is provided at the extremity thereof projecting into the still with a nozzle 20 which is curved so that the glycerin issuing therefrom will be directed tangentially against the cylindrical wall of the still and thus caused to circulate within the still. The steam pipe 8 is designed to deliver steam into the still in the same direction, for which purpose it may be equipped with a nozzle like that of the glycerin pipe, or in lieu thereof a deflector plate 21 may be mounted in the still as shown in Fig. 3. Intermediate the entrances of the steam and glycerin pipes, and disposed transversely of the still, is an annular ledge 22 affording a central passage way 23, the inner edge of the ledge being serrated as shown at 24. From the top of the still 9 a pipe 25 leads to the glycerin condenser 26.

The glycerin condenser comprises a hot water condenser indicated at 27, having vertical tubes 35 forming vapor passages surrounded by hot water supplied at 28, and a subjacent glycerin distillate tank 29 having an outlet pipe 30 leading to a suitable vessel 31. From points above the water line in the condensers pipes A are shown leading to a pipe B opening into the steam pipe 8, a branch C extending to either or both of the evaporators 3, 6, and having suitable valves controlling the passages. A pressure regulator D is shown in pipe B. Within tank 29 is an entrainment receptacle 32 also provided with an outlet pipe 33 and receiving vessel 34 in communication with the still. The entrainment receptacle 32 is separated at all points from the glycerin distillate tank 29 and terminates at its upper end well short of the tubes 35 of the condenser. An inverted U-shaped deflector 36 has its bridge portion interposed between the top of the receptacle 32 and the condenser 27, its laterals 38 extending down into the space between tank 29 and receptacle 32. The bridge portion or top of the deflector 36 is dished as at 36ª to form a receiver for the condensed glycerin which passes from tubes 35 through pipe 27ª to a vessel 27ᵇ. The pipe 25 by which steam and glycerin vapors are conveyed from the still passes through the walls of the parts 29, 32, and into the entrainment receptacle, its extremity being bent downwardly.

The darts $a$ indicate the line of direction of the vapors from pipe 25 to and through the condenser and darts $b$ indicate the direction of the glycerin condensing in tank 29 and also the return of the condensed glycerin from the tubes 35 and their passage to vessel 27ᵇ. The temperature of the water in the condenser is such as to condense the glycerin while maintaining the steam, the latter continuing to the succeeding still 37, which as well as the glycerin heater and the condenser, are constructed and operate like the corresponding parts described, save that a steam superheater is not necessary at the succeeding distillations. The outlet from the last of the glycerin condensers connects with a glycerin and steam condenser 39 which is supplied with cold water and communicates with evaporator 3 to supply sweet water thereto. Condenser 39 is also in communication through pipe 40 with the vacuum pump 41.

In operating the distillation system the vacuum pump is operated to create a vacuum of about 28 inches in the stills, evaporator 6 and the tubes of the glycerin condensers. By adjusting the pressure regulator D the vacuum in the hot water spaces of the glycerin condensers is reduced to about 16 inches so that the water will boil at about 175 degrees F. This pressure will insure the glycerin fully condensing while maintaining the steam at high temperature. To obtain this temperature a pressure of about 7 pounds absolute or vacuum of about 16 inches in pipe B is essential. The weight on the regulator D is therefore adjusted so that with 28 inches of vacuum, or, 1 pound absolute, in the stills, the valve will be seated as against a pressure of 7 pounds or less in pipe B. When the operation of the vacuum pump is begun it exhausts the air from the stills and condenser tubes and the parts communicating therewith, but the pressure in pipes A and B and the hot water spaces of the condensers will not be affected by reason of the weight holding the regulator valve seated. But when the pressure in the stills reaches about 6.7 pounds (the approximate difference in the pressures) the pressure in pipe B will unseat the valve. The further lowering of pressure in the stills continues to lower that in pipe B but the difference of approximately 6.7 pounds between the two pressures remains constant. Consequently when a vacuum of 28 inches in the stills is attained the vacuum in pipe B will be about 16 inches.

Each of the stills is supplied with crude glycerin 15 which is forced by the centrifugal pump 17 through the heaters 18 to each of which steam under about 175 pounds pressure is supplied through pipe 12. The glycerin enters the still in a highly heated condition but not sufficiently so as to occasion its decomposition, and not having been brought into contact with steam during its passage through the heaters the salt will not deposit on the heating surface but will be carried in solution or suspension into the still and the two elements will circulate therein above the annular ledge 22. The glycerin and impurities will gravitate through opening 23 over the serrations 24 which will tend to create divided columns. While the glycerin is taking this course through the still after entering above the ledge the steam from evaporator 6, superheated at 10 by steam at 200 pounds pressure supplied to the superheater from the boiler, is entering the still below the ledge and circulating therein. As the steam vapors follow their natural course toward the outlet pipe 25 they pass from beneath the ledge and up through passage 23 and in taking this line of direction they encounter the divided streams or columns of gravitating glycerin. This insures the effective physical association of the steam with the glycerin, resulting in vaporizing the glycerin and causing its vapors to combine with and take the direction of the steam upward to the exit pipe 25, the unvaporized glycerin and such of the impurities as may not be carried up with the vapors falling into the crude glycerin 15 in the still to be again circulated through the pump and heater and distilled in the further operation of the system. From the stills the combined steam and glycerin vapors pass downward out of pipe 25 into receptacle 32 where practically all of the impurities carried up through the still as entrainment will fall, and passing out through pipe 33 to vessel 34 may be collected and removed or returned to the still. In this connection it will be noted that the distillate tank 29, by completely inclosing the entrainment receptacle 32, operates as a temperature shield for the latter to maintain it heated, and that this function is aided by the element 36 and the heated vapors and glycerin passing through the spaces between the parts 29, 36 and 32. In this way the interior of the receptacle 32 is kept at such high temperature that only the entrainment will be deposited therein, whereas if this receptacle were exposed to the atmosphere it would operate as a partial condenser of the glycerin vapors. Hence I term receptacle 32 a non-condensing separator. The steam and glycerin vapors follow the course indicated by darts a to the condenser tubes where the glycerin vapors are liquefied by the action of the hot water in which the tubes 35 are submerged, the condensed glycerin then falling from the tubes into the basin 36ª and then to vessel 27ᵇ as indicated by darts b. Some of the glycerin, however, will condense in tank 29 and pass through pipe 30 to vessel 31, as also indicated by darts b. Although the condensed glycerin in its return from the condenser is directly in contact with the combined steam and glycerin vapors passing to the condenser yet this circumstance will not affect the liquefied glycerin for the reason that the steam is carrying all the glycerin vapors which it can hold, and therefore it cannot absorb any of the condensed glycerin. On the other hand, as the glycerin quickly condenses after entering the tubes 35, or moving a short distance upward therein, and then returns downward out of the tubes, its movement is confined to the portion of the condenser in which the vapor and condensate are hottest and consequently its temperature is maintained too high to allow it to manifest its affinity for the steam. In this respect the operation of the mechanism embodying the present invention possesses a distinct advantage as compared with the described manner of operating the mechanism shown in the Letters Patent 881,525 as appropriate for carrying out the process therein covered. In the patent referred to the course of the glycerin is shown and described as passing entirely through the tubes b and thus the glycerin might be sufficiently cooled upon issuing from the tubes to absorb some of the steam. The greater part of the volatile impurities carried over with the glycerin vapors have a relatively low condensing temperature. Consequently but a small portion will condense on the walls of tank 29 and for this reason the glycerin collected in the receiver 31 is of first quality while that collected in the vessel 27ᵇ is of a lesser degree of purity or second quality owing to the fact that it will contain more of the volatile impurities condensed in the tubes 35.

When the glycerin vapors condense they give up to the water surrounding the tubes 35 the heat which they have taken from the high pressure steam in heater 18. This water, therefore, in the presence of the vacuum of 16 inches will boil at about 175 degrees F. and the steam thus generated may be allowed to accumulate in pipes A and B where it may be retained until any desired pressure is reached, by adjusting the regulator weight, and on reaching this pressure it will pass to pipe 8 for use in the stills or through branch C to either or both of the evaporators. Again, this steam may be availed of in some of the mechanical devices as, for instance, the operation of the pumps 17, any of such uses tending to promote the economy of the system by lessening the amount of steam required of the boiler.

After leaving the glycerin condenser the steam relieved of most of its glycerin contents with its distilling value fully regained and changed only by its temperature being lowered from the highly superheated to near the saturation point, passes on for use in the succeeding stills. This steam is dry and therefore additional superheating for each succeeding distillation is not necessary and only one superheater is illustrated. The functions of each of the stills and its respective glycerin heater and condenser are identical with those described. The condenser 39 differs from the others in that it is supplied with cold water to condense both the steam and glycerin. The sweet water passes to the evaporator 3 where the water is boiled out of the glycerin. This vapor I prefer not to employ in the stills as it yet contains some volatile impurities. I therefore conduct the vapor to the heating space 5 of the evaporator 6, the latter containing pure water which, by the action of the sweet water vapors, generates pure steam to be conducted through pipe 8 to the stills.

From the foregoing it will be apparent that the essential steps of the distilling process embraced by the Letters Patent referred to are performed in the operation of the mechanism constituting the subject of this application. A single column of steam successively combines with and distils the glycerin contained in a plurality of stills. After each distillation glycerin is condensed out of the steam and the sweet water from the final or steam and glycerin condenser may be, by the double effect arrangement of the evaporators 3 and 6, utilized in generating the pure steam supplied to the stills. The salient distinctions, however, between the apparatus shown in the patent as appropriate for carrying out the process, and that forming the subject of the present case, are that where the former contemplates only the broadly novel idea of the multiple effect of a steam column in the art of glycerin distillation, the latter is directed to providing improved means for carrying out the process under certain conditions as when salt is present in the glycerin, and specifically embodies improved means for separately heating the glycerin when not in the presence of steam so that it will have been heated before mingling with the steam, instead of effecting the heating of both steam and glycerin at the time of their association, the latter mode of treatment being productive of satisfactory results when the glycerin to be distilled is relatively pure.

The advantages of the single steam supply to a plurality of stills, over the separate supplies thereto, and the manner of combining the steam and glycerin, as well as the physical laws which are invoked in the distillation system, are apparent to those skilled in the art and are fully set forth in the Letters Patent herein referred to.

While I have specified glycerin as the element for which the invention is primarily adapted, yet it is available in any distilling system where steam is necessary to assist distillation and where the element to be distilled has a boiling point higher than that of water, such as the products of petroleum and coal tar, anilin, essential oils and fatty acids of the candle industry.

I claim as my invention:—

1. In an apparatus for distilling glycerin or similar material, a series of stills, means for conducting a single current of steam successively through all of the said stills under substantially uniform pressure, a vertically disposed condenser for each of said stills, means for conducting the glycerin vapors from a still into the lower portion of its respective condenser and upward therein, and means for collecting beneath said condenser the glycerin liquefied therein.

2. In an apparatus for distilling glycerin or similar material, a series of stills, means for conducting a single current of steam successively through all of the said stills under substantially uniform pressure, a glycerin condenser for each of said stills; means for conducting the glycerin vapors from a still upward into its respective condenser, means for collecting beneath said condenser the glycerin liquefied therein, and means for conducting the steam from said glycerin condenser to the succeeding still.

3. In an apparatus for distilling glycerin, a series of stills, means for causing a column of glycerin to flow through each of said stills, means for conducting a single current of steam successively to each of said stills and passing it therethrough in a direction which intersects the column of glycerin flowing therein, and means for condensing the glycerin vapors of each flowing column.

4. In a glycerin distilling apparatus, a series of stills, a heater for each of said stills, means for conducting glycerin to said heaters and thence to said stills, means for causing the glycerin entering each of said stills to flow in a column, and means for conducting a single current of steam successively to each of said stills and to the flowing columns of heated glycerin therein, and means for condensing the glycerin vapors of each flowing column.

5. In a glycerin distilling apparatus, a still, a glycerin condenser having vapor passages and a hot water space surrounding said passages, means for vaporizing glycerin in said still, means for conducting the glycerin vapors from said still upward through said condenser passages, means for collecting the liquefied glycerin and means for conducting from the hot water space of said condenser the steam generated therein by the condensation of the glycerin vapors.

6. In a glycerin distilling apparatus, a still, a glycerin condenser having vapor passages and a hot water space surrounding said passages, means for mingling steam and glycerin in a heated condition in said still, means for conducting the steam and glycerin vapors from said still upward through said condenser passages to condense the glycerin while maintaining the steam, means for collecting the liquefied glycerin, and means for conducting to the steam supply the steam generated in the hot water space of the condenser by the condensation of the glycerin vapors.

7. In a glycerin distilling apparatus, a still, means for vaporizing glycerin therein, a glycerin condenser having vapor passages and a hot water space surrounding said passages, a vacuum pump and connections between the latter and said still and said glycerin condenser, and means for maintaining a lower degree of vacuum in the hot water space of said condenser than in said still.

8. In a glycerin distilling apparatus, a still, means for vaporizing glycerin therein, a glycerin condenser having vapor passages and a hot water space surrounding said passages, a pipe connection between said hot water space and the distillation system, and a pressure regulator in said pipe connection for the purpose stated.

9. In a glycerin distilling apparatus, a still, a glycerin heater, and means for conducting glycerin from said heater to said still and causing it to gravitate and circulate therein.

10. In a glycerin distilling apparatus, a still having an outlet at its top, a glycerin heater, means for conducting glycerin from said heater to said still and causing it to gravitate and circulate therein, a steam pipe entering said still beneath the entrance point of the glycerin and designed to discharge and direct the steam so that it will circulate in said still, whereby the steam in its passage to said outlet will encounter the gravitating glycerin.

11. In a glycerin distilling apparatus, a still having an outlet at its top, a glycerin heater, means for conducting glycerin from said heater to said still and causing it to gravitate and circulate therein, an annular ledge within said still beneath the entrance point of the glycerin, and a steam pipe entering said still below said ledge.

12. In a glycerin distilling apparatus, a still having an outlet at its top, a glycerin heater, means for conducting glycerin from said heater to said still and causing it to gravitate and circulate therein, an annular ledge within said still beneath the entrance point of the glycerin, said ledge having its inner free edge serrated, and a steam pipe entering said still below said ledge.

13. In a glycerin distilling apparatus, a still having a crude glycerin receptacle, a glycerin heater, a pipe leading from said receptacle to said heater, a pump for forcing glycerin therethrough, and a pipe leading from said heater into said still.

14. In a glycerin distilling apparatus, a still, means for forcing heated glycerin into said still and causing it to flow in gravitating columns, a steam supply entering said still beneath the point of introduction of the glycerin, and a superheater located in said steam supply.

15. In a glycerin distilling apparatus, a still, means for vaporizing glycerin therein, an entrainment receptacle or non-condensing separator in communication with said still, and a glycerin condenser in communication with said entrainment receptacle.

16. In a glycerin distilling apparatus, a still, means for vaporizing glycerin therein, an entrainment receptacle, a connection between said still and said receptacle, a casing inclosing said receptacle, and a glycerin condenser in communication with said receptacle.

17. In a glycerin distilling apparatus, a still, means for vaporizing glycerin therein, an entrainment receptacle, a connection between said still and said receptacle, a casing inclosing said receptacle, and separated therefrom at all points, and a glycerin condenser, the space between said casing and said receptacle affording means of communication between the latter and said condenser.

18. In a glycerin distilling apparatus, a still, means for vaporizing glycerin therein, an entrainment receptacle in communication with said still and open at its top, an inverted U-shaped deflector having its bridge portion above the top of said receptacle and its parallel members extending downwardly over, but out of contact with, said receptacle, a casing inclosing said receptacle and deflector, and a glycerin condenser above said casing.

19. In a glycerin distilling apparatus, a still, means for vaporizing glycerin therein, an entrainment receptacle in communication with said still and open at its top, an inverted U-shaped deflector having its bridge portion above the top of said receptacle and its parallel members extending downwardly over, but out of contact with, said receptacle, said deflector constituting a distillate basin having a receiving and collecting vessel, a distillate tank inclosing said receptacle and deflector, and a glycerin condenser above said tank.

20. In a glycerin distilling apparatus, a series of stills and alternate glycerin condensers, each of said stills being designed to contain a body of glycerin, connections between each of said stills and its respective condenser and each of said condensers and the succeeding still whereby a line of communication is provided throughout the system out of contact with the respective bodies of glycerin, a steam supply passing through said line of communication, and means for withdrawing glycerin from each of said stills and returning it thereto in a gravitating column which intersects the line of travel of the steam through the still.

21. In a glycerin distilling apparatus, a series of stills and alternate glycerin condensers, connections between each of said stills and the bottom of its respective condenser and the top of each of said condensers and the succeeding still, a steam and glycerin condenser in the series thereof, and a sweet water evaporator in communication with said steam and glycerin condenser.

22. In a glycerin distilling apparatus, means for vaporizing glycerin by the action of steam, means for condensing the steam and glycerin vapors, an evaporator having a water space and a steam space, means for conducting the sweet water from the steam and glycerin condenser to the water space of said evaporator, means for supplying steam to the steam space of said evaporator, a second evaporator having a steam space and a water space designed to contain pure water, and means for conducting the vapors from the sweet water evaporator to the steam space of said pure water evaporator.

23. In a glycerin distilling apparatus designed to effect a series of glycerin distillations by the successive action of a single current of steam, a series of stills each designed to contain a body of glycerin, means for conducting a steam current through said series of stills and upwardly through and around in each of said stills, out of contact with the body of glycerin therein, means for withdrawing glycerin from each of said stills and heating it and introducing it to the still above the entrance point of said steam current in a circular line of direction, and means for dividing said glycerin into a series of columns in the path of the steam current.

In testimony whereof, I have signed this specification in the presence of two subscribing witnesses.

FRANK J. WOOD.

Witnesses:
GRAFTON L. McGILL,
ALICE D. LIND.